United States Patent
Shaw

(10) Patent No.: US 8,596,353 B2
(45) Date of Patent: Dec. 3, 2013

(54) PRESSURE MEASUREMENT IN HIGHLY DEVIATED WELLS

(75) Inventor: Joel D. Shaw, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 264 days.

(21) Appl. No.: 12/964,587

(22) Filed: Dec. 9, 2010

(65) Prior Publication Data

US 2012/0145383 A1  Jun. 14, 2012

(51) Int. Cl.
*E21B 47/00* (2012.01)
(52) U.S. Cl.
USPC ............... 166/250.07; 166/163; 73/152.22; 73/152.51
(58) Field of Classification Search
USPC ............... 166/250.07, 169, 163; 73/152.22, 73/152.51, 426
See application file for complete search history.

(56) References Cited

U.S. PATENT DOCUMENTS

| | | | |
|---|---|---|---|
| 3,712,129 A | 1/1973 | Rhoades | |
| 3,874,231 A | 4/1975 | Walther, Jr. | |
| 4,010,642 A | 3/1977 | McArthur | |
| 4,058,015 A | 11/1977 | Stode | |
| 4,976,142 A | 12/1990 | Perales | |
| 4,979,563 A | 12/1990 | Patel | |
| 5,163,321 A | 11/1992 | Perales | |
| 5,503,013 A | 4/1996 | Zeller | |
| 7,546,878 B2 * | 6/2009 | Prado et al. | 166/311 |
| 2004/0031319 A1 | 2/2004 | Perales | |
| 2008/0041581 A1 | 2/2008 | Richards | |

FOREIGN PATENT DOCUMENTS

| | | |
|---|---|---|
| EP | 0528692 A2 | 2/1993 |
| EP | 0695853 A2 | 2/1996 |
| GB | 2305724 A | 4/1997 |
| JP | 2001033294 A | 2/2001 |

OTHER PUBLICATIONS

Welldynamics, "PTS (Pressure Transmission System)", Presentation, undated, 41 pages.
Sperry-Sun Drilling Services, "Sperry-Sun Production Services PTS/CTS Equipment" Product manual, dated Feb. 1994, 118 pages.
Halliburton, "EZ-Gauge Permanent Pressure Monitoring System", Product brochure, H07002, dated May 2010, 2 pages.
Japan Patent Abstracts from the European Patent Office, for JP Publication No. 2001033294, dated Feb. 9, 2010, 1 page.
International Search Report with Written Opinion issued Jul. 12, 2012 for PCT Patent Application No. PCT/US11/063075, 9 pages.

* cited by examiner

*Primary Examiner* — David Bagnell
*Assistant Examiner* — Taras P Bemko
(74) *Attorney, Agent, or Firm* — Smith IP Services, P.C.

(57) ABSTRACT

A pressure measurement system for use with a subterranean well can include a chamber positioned in the well, the chamber having an upper portion and a lower portion as positioned in the well, and a device which, in response to gravity acting on the device, selects the upper portion of the chamber for communication with a line extending to a remote location. A method of measuring pressure in a well can include introducing a chamber into the well, then selecting a vertically upper portion of the chamber, and establishing communication between the upper portion of the chamber and a line extending to a remote location.

13 Claims, 8 Drawing Sheets

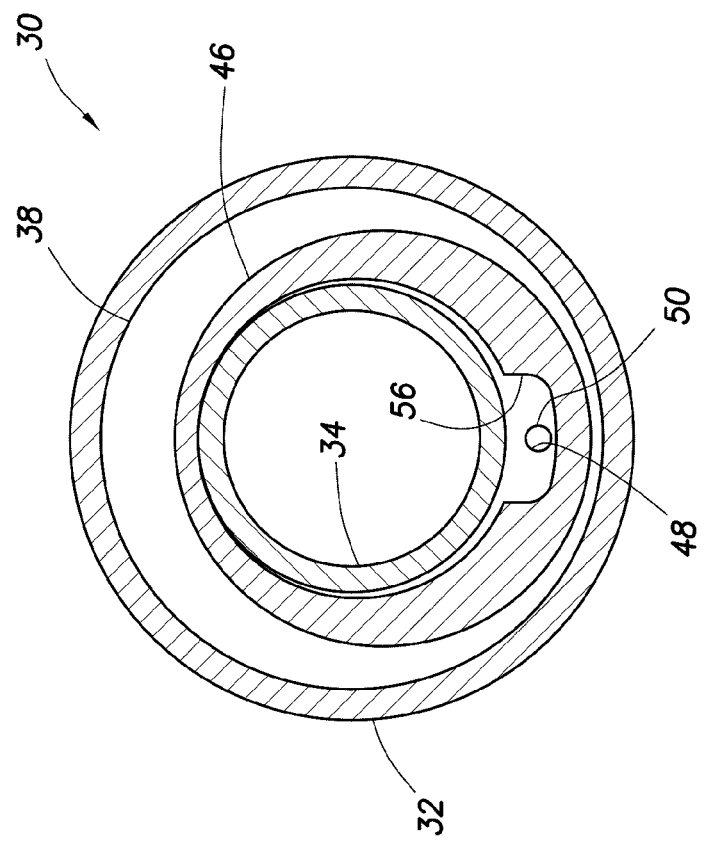
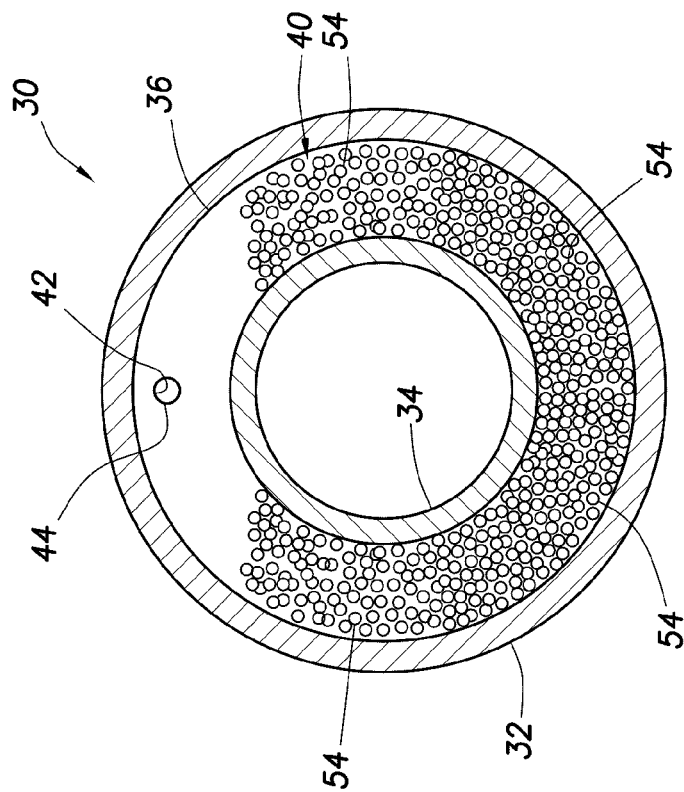
FIG.9
FIG.8

PRESSURE MEASUREMENT IN HIGHLY DEVIATED WELLS

BACKGROUND

This disclosure relates generally to equipment utilized and operations performed in conjunction with a subterranean well and, in an example described below, more particularly provides for pressure measurement in highly deviated wells.

In a conventional technique for measuring pressure in a wellbore, a small diameter tube is connected to a top of a chamber in the wellbore, and a bottom of the chamber is exposed to wellbore pressure. Pressurized gas is applied to the tube at the surface to fill the chamber with gas. Measurement of pressure in the tube at the surface enables wellbore pressure to be conveniently determined.

Unfortunately, such a system suffers from disadvantages when it is desired to measure pressure in a wellbore which is highly deviated from vertical. Especially in a horizontal or near-horizontal wellbore, such a system can be unusable.

Therefore, it will be appreciated that improvements are needed in the art of pressure measurement in highly deviated wells.

SUMMARY

In the disclosure below, systems and methods are provided which bring improvements to the art of pressure measurement in highly deviated wells. One example is described below in which a weighted blocking device is used to selectively block communication ports in a well pressure measurement system. Another example is described below in which the device selectively establishes communication between upper and lower portions of a chamber and respective pressure sources.

In one aspect, a pressure measurement system for use with a subterranean well is provided to the art by this disclosure. The system can include a chamber positioned in the well, and the chamber having an upper portion and a lower portion as positioned in the well. A device selects the upper portion of the chamber for communication with a line extending to a remote location, in response to gravity acting on the device.

In another aspect, a method of measuring pressure in a well is provided by this disclosure. The method can include: introducing a chamber into the well; then selecting a vertically upper portion of the chamber; and establishing communication between the selected upper portion of the chamber and a line extending to a remote location.

The lower portion of the chamber can be placed in communication with a wellbore or other pressure source for which it is desired to measure its pressure. The upper and lower portions of the chamber are not determined, until the chamber is positioned in the well.

These and other features, advantages and benefits will become apparent to one of ordinary skill in the art upon careful consideration of the detailed description of representative examples below and the accompanying drawings, in which similar elements are indicated in the various figures using the same reference numbers.

BRIEF DESCRIPTION OF THE DRAWINGS

FIGS. 8-11 are representative cross-sectional views of additional configurations of the apparatus.

DETAILED DESCRIPTION

Figure 1:
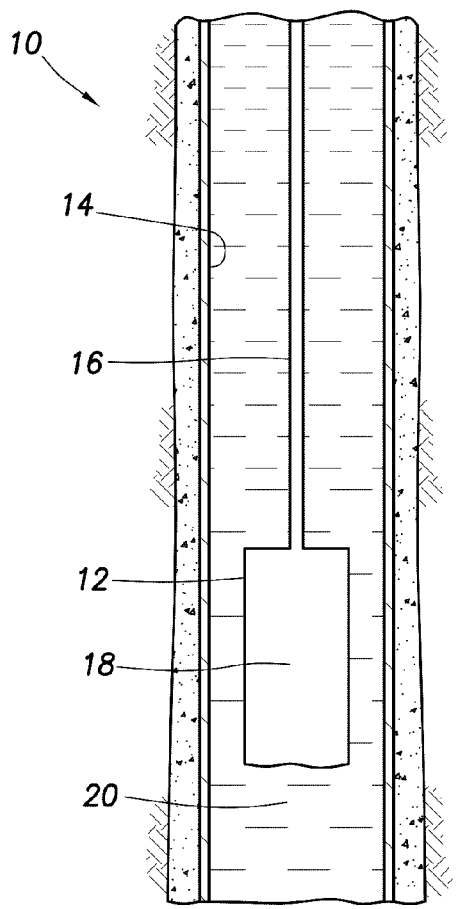
FIGS. 1-3 are representative cross-sectional views of a prior art method of measuring pressure in a wellbore.
Figure 2:
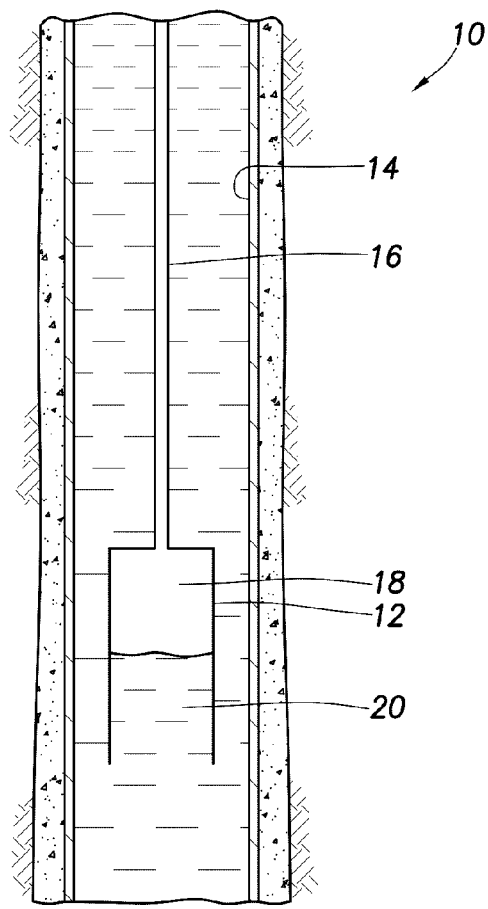
Figure 3:
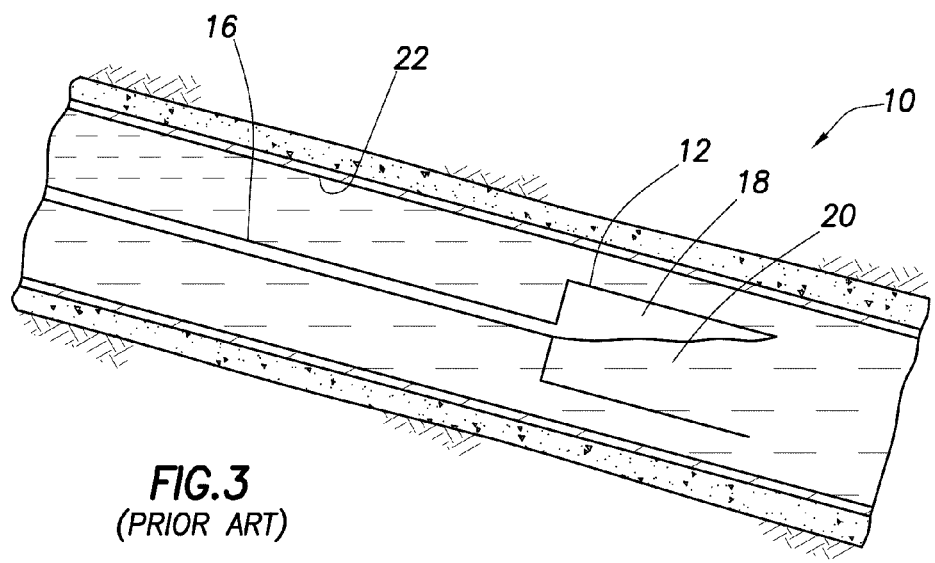

Illustrated in FIGS. 1-3 is a prior art system 10 and associated method for measuring pressure in a wellbore 14. In the system 10, a chamber 12 is lowered into the wellbore 14 connected to a line 16. A pressurized gas 18 is then forced down the line 16 and into the chamber 12, displacing well fluid 20 out of the chamber 12.

In FIG. 1, the system 10 is depicted after the well fluid 20 has been displaced completely out of the chamber 12. At this point, pressure in the gas 18 balances pressure in the well fluid 20 at the chamber 12. If pressure in the well fluid 20 increases, the gas 18 will be compressed, and the well fluid will enter the chamber 12 as depicted in FIG. 2. Since the pressure in the gas 18 continues to balance pressure in the well fluid 20, this increase in pressure in the well fluid can be detected by monitoring the pressure in the gas 18 via the line 16, which extends to a remote location, for example, to the earth's surface. This type of pressure measurement is described in U.S. Pat. No. 4,010,642, the entire disclosure of which is incorporated herein by this reference.

The system 10 performs well in substantially vertical wellbores, such as the wellbore 14 depicted in FIGS. 1 & 2. However, if the chamber 12 is positioned in a wellbore 22 which is horizontal or at least substantially deviated from vertical, as depicted in FIG. 3, serious problems develop in the system 10. For example, the usable volume of the chamber 12 is significantly reduced, which substantially limits the range of pressures in the well fluid 20 which may be measured using the system 10. As another example, there is the danger that the well fluid 20 will enter the line 16, plugging the line and requiring replacement, or at least retrieval and cleaning, of the line at substantial expense.

It is generally considered that the system 10 cannot be used in wellbores which are deviated from vertical greater than about 70°. Significant problems may be experienced when the system 10 is used in wellbores deviated greater than about 60°. As used herein, the term "substantially deviated" is used to describe wellbores which are deviated greater than about 50° from vertical.

It has become increasingly common for wellbores to be drilled horizontally and at other substantial deviations from vertical. The system 10 as depicted in FIGS. 1-3 is largely unsuitable for use in these wellbores, and so there is a need for an improved method of measuring pressure in substantially deviated wellbores. Some wellbores are even drilled past horizontal, that is, the wellbores incline upward in the direction in which they are drilled. It will be appreciated that the system 10 is completely unusable in these wellbores drilled past horizontal, since the chamber 12 would fill with well fluid 20, and well fluid would enter the line 16.

Figure 4:
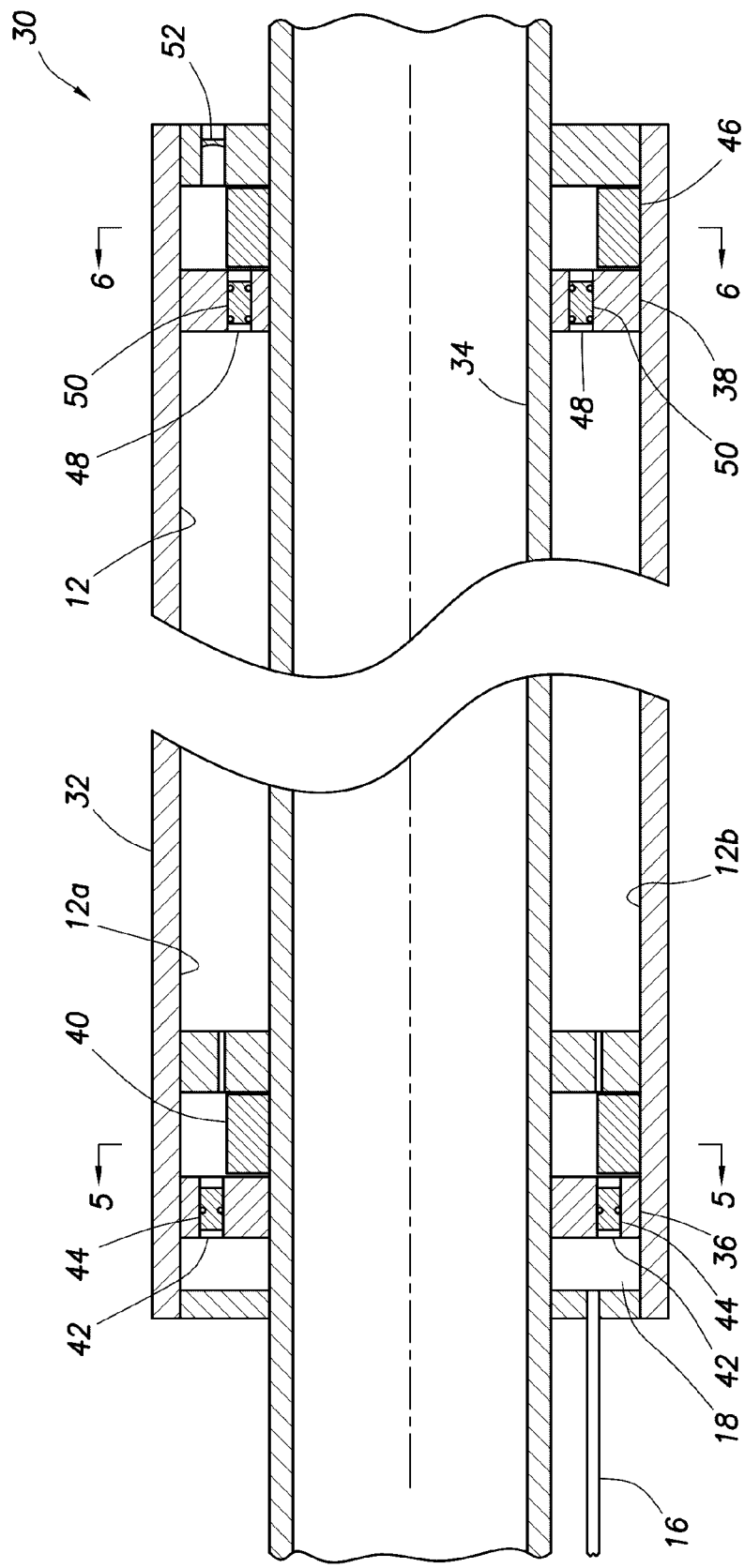
FIG. 4 is a representative cross-sectional view of a pressure measurement apparatus which can embody principles of the present disclosure.

Representatively illustrated in FIG. 4 is a well pressure measurement apparatus 30 and associated method which can embody principles of this disclosure. The apparatus 30 can be used in an improvement to the system 10 and method described above. Of course, the apparatus 30 can be used in other systems and methods while remaining within the scope of this disclosure.

As depicted in FIG. 4, the apparatus 30 includes the chamber 12 described above. The chamber 12 of the apparatus 30 is annular shaped and is positioned radially between a tubular outer housing 32 and a tubular inner housing 34. The chamber 12 also extends longitudinally between annular bulkheads 36, 38 at its opposite ends. However, chambers having other shapes can be used, if desired.

In a non-vertical orientation of the apparatus 30 as depicted in FIG. 4, it will be appreciated that the chamber 12 has a vertically upper portion 12a and a vertically lower portion 12b. However, which portion of the chamber 12 will be the upper portion 12a, and which will be the lower portion 12b, is unknown when the apparatus 30 is installed in the wellbore 14. The inner housing 34 is designed for interconnection in a tubular string (such as a production tubing string), and the tubular string can rotate when it is installed.

Since the line 16 should be in communication with the chamber upper portion 12a and the chamber lower portion 12b should be in communication with the wellbore 14 for effective pressure measurement, but the rotational orientation of the chamber 12 after installation is not known until after installation, the apparatus 30 provides for selecting the chamber upper portion 12a for communication with the line 16 and selecting the chamber lower portion 12b for communication with the wellbore 14 after installation of the apparatus in the well.

The selection of which portion of the chamber 12 will be placed in communication with the line 16 is performed by a weighted blocking device 40 in conjunction with multiple ports 42 formed through the bulkhead 36. The ports 42 in this example are plugged with plugs 44 which can be blocked by the device 40.

All of the ports 42 are plugged by the plugs 44, as depicted in the as-installed state of the apparatus 30 in FIG. 4. Thus, the line 16 is not in communication with any portion of the chamber 12.

However, if pressure in the line 16 is sufficiently increased, the plugs 44 will be biased to the right as viewed in FIG. 4. Some, but not all, of the plugs 44 will be blocked by the device 40, and will thereby be prevented from being pushed out of the ports 42 by the pressure applied to the line 16.

Figure 5:
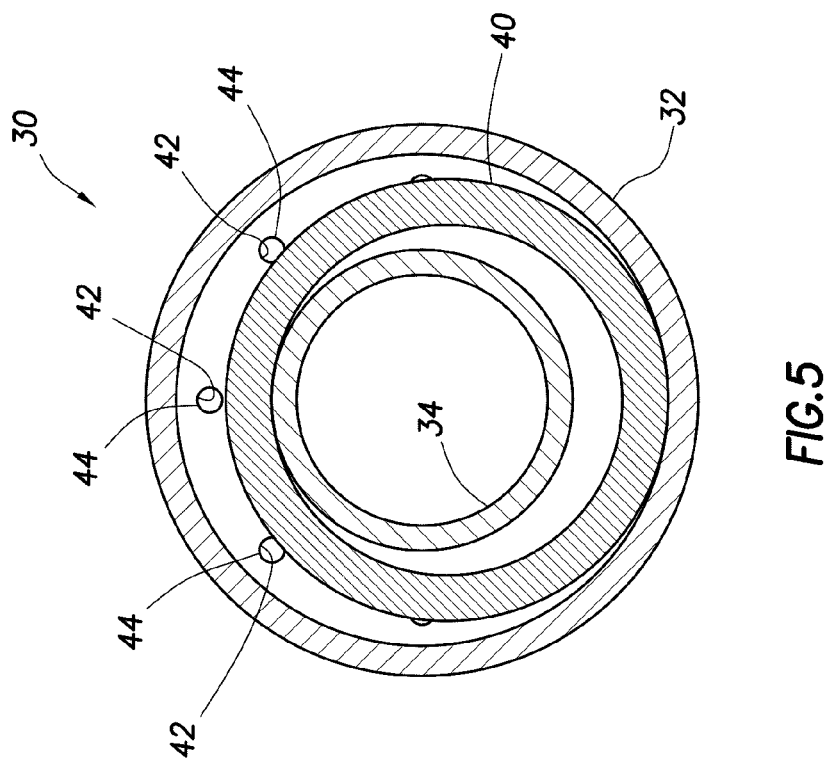

The cross-sectional view of FIG. 5 shows how the device 40 blocks some of the plugs 44, but does not block others of the plugs. Note that the plug 44 which is vertically highest relative to the other plugs is not blocked by the device 40, but the lowermost plugs are blocked by the device.

The device 40 is retained radially between the inner and outer housings 32, 34, but is permitted to displace vertically relative to the chamber 12 and the vertically distributed ports 42 and plugs 44. In this manner, gravity acting on the device 40 causes it to be positioned opposite the lower ports 42 and plugs 44, but not the uppermost port and plug.

Figure 6:
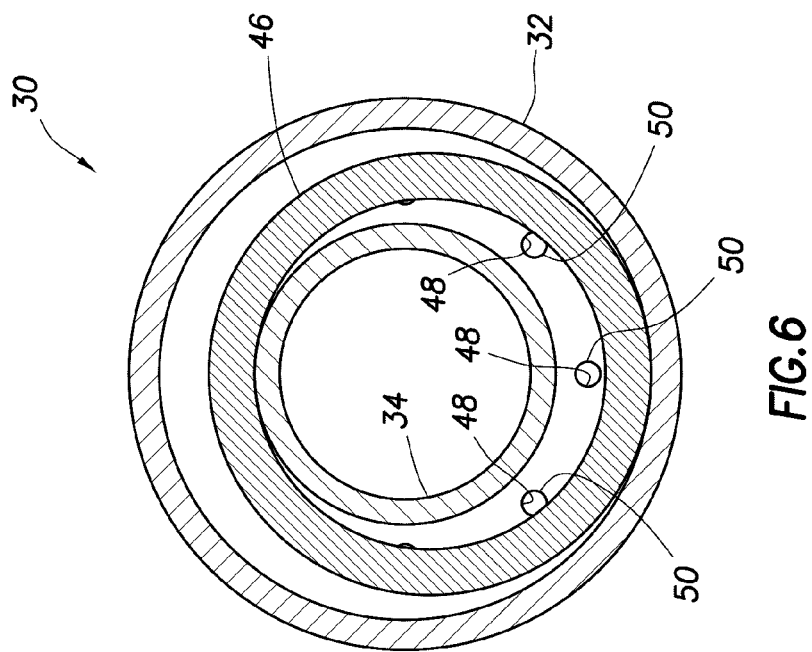
FIGS. 5 & 6 are cross-sectional views of the pressure measurement apparatus, taken along respective lines 5-5 and 6-6 of FIG. 4.

The device 40 is depicted in FIGS. 4-6 as being annular shaped, but other shapes and configurations are possible within the scope of this disclosure. Some further examples are depicted in FIGS. 8-11, but it should be clearly understood that no particular shape or configuration of the device 40 is required in keeping with the principles of this disclosure.

The cross-sectional view of FIG. 6 shows how another similar device 46 selectively blocks ports 48 and plugs 50 in the bulkhead 38. However, in this case, the device 46 blocks the upper ports 48 and plugs 50, but does not block the lowermost port and plug. Thus, if sufficient pressure is applied to the chamber 12, the lowermost plug 50 can be ejected from the lowermost port 48, but the device 46 will prevent the other plugs from being ejected from their respective ports.

Figure 7:
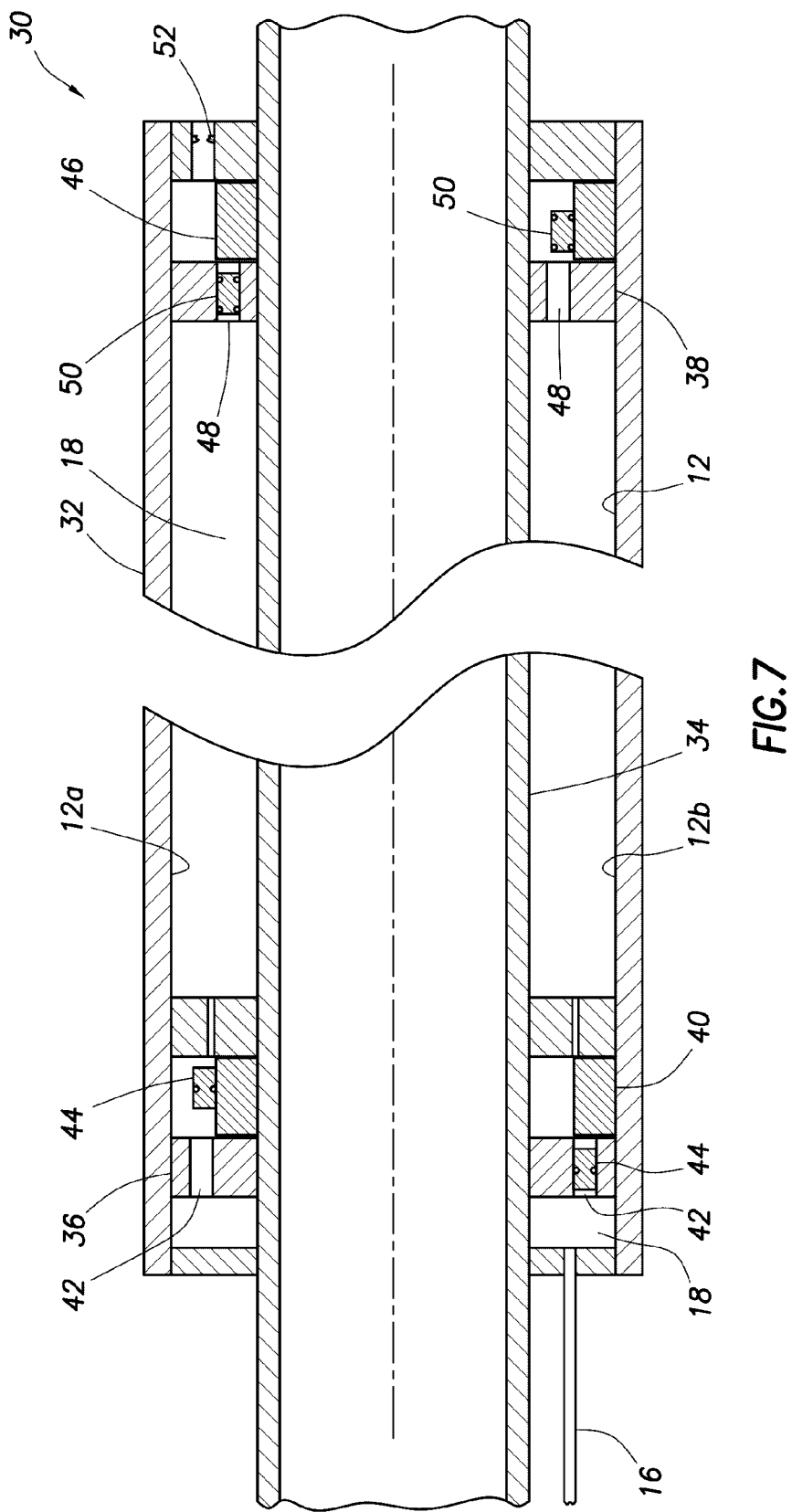
FIG. 7 is a representative cross-sectional view of the apparatus as activated for pressure measurement.

Referring additionally now to FIG. 7, the apparatus 30 is depicted after increased pressure has been applied to the line 16 from a remote location (such as a pressurized source of the gas 18 at the surface). Note that the uppermost plug 44 has been ejected from the uppermost port 42 in the bulkhead 36. This allows the increased pressure to enter the chamber 12.

The increased pressure in the chamber 12 has ejected the lowermost plug 50 from the lowermost port 48 in the bulkhead 38. The increased pressure has, thus, been allowed to act on a rupture disc 52 which previously isolated the interior of the apparatus 30 from wellbore pressure.

When the increased pressure is sufficiently great, the rupture disc 52 will rupture, thereby exposing the chamber 12 to wellbore pressure. The apparatus 30 can now be used to measure pressure in the wellbore 14, because the line 16 is in communication via the opened port 42 with the upper portion 12a of the chamber 12, and the lower portion 12b of the chamber is in communication with the wellbore 14 via the open port 48 and the ruptured disc 52.

Note that the plugs 44, 50 could be releasably secured in their positions in the bulkheads 36, 38 by use of shear pins, snap rings, latches, etc., to maintain the positions of the plugs until a predetermined pressure differential is applied to the plugs.

In the example of the apparatus 30 described above, the devices 40, 46 have inner and outer diameters selected so that the devices block the respective upper or lower ports 42, 48 in the bulkheads 36, 38. However, other configurations may be used, if desired, to selectively block the ports 42, 48 which should not be opened when increased pressure is applied to the line 16. Examples of other configurations are representatively illustrated in FIGS. 8-11.

In FIG. 8, the device 40 comprises many small balls 54 which will fall to a lower side of the bulkhead 36 to block the lower ports 42.

In FIG. 9, the device 46 is somewhat annular shaped, but has a thickened, heavier weight, portion with a window 56 to align with the lowermost port 48 and plug 50 in the bulkhead 38.

Figure 10:
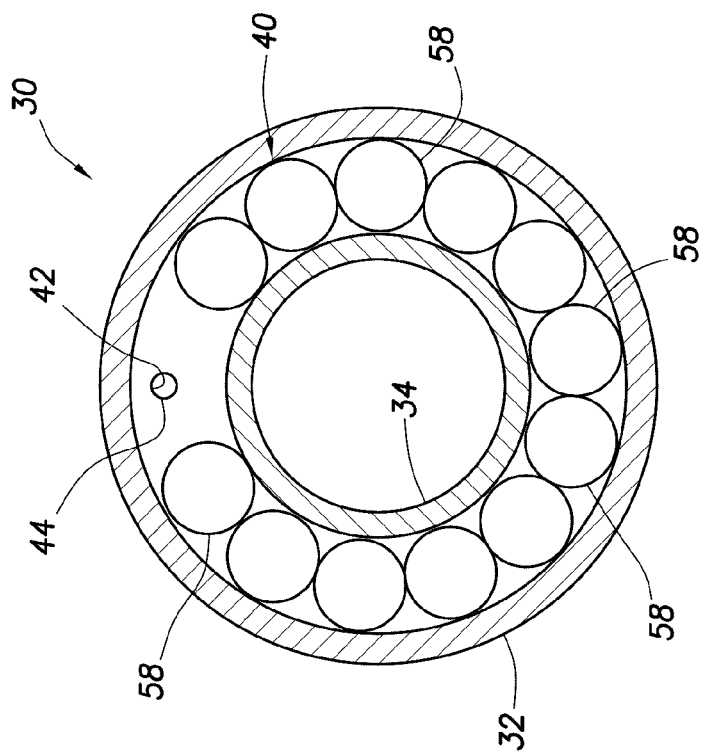

In FIG. 10, the device 40 comprises multiple discs 58 which will roll toward the lower side of the bulkhead 36 to block all but the uppermost port 42 and plug 44.

Figure 11:
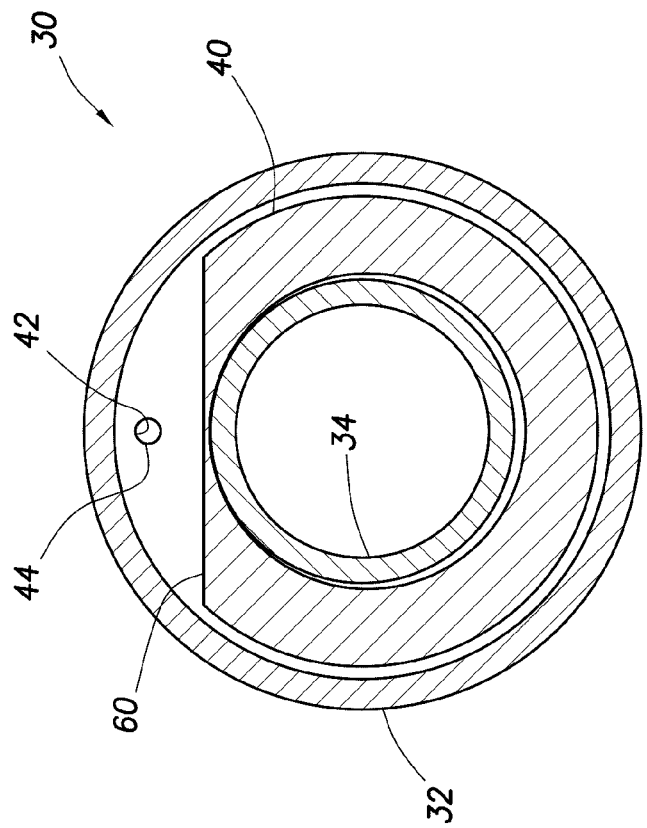

In FIG. 11, the device 40 has an annular shape, but it also has a flattened side 60 which ensures that the device does not block the uppermost port 42 and plug 44 in the bulkhead 36.

It will, thus, be readily appreciated that the scope of this disclosure is not limited to any particular device configuration, placement, etc. Instead, it should be clearly understood that any type of device which can block flow through all but the uppermost of the ports 42, and/or all but the lowermost of the ports 48, may be used in the apparatus 30 or other pressure measurement apparatuses. For example, the devices 40, 46 could block flow through the respective lowermost ports 42 and uppermost ports 48 by sealing off the ports, etc.

The device 40 can allow flow through more than one of the ports 42, and the device 46 can allow flow through more than one of the ports 48, if desired. Thus, it is not necessary for the devices 40, 46 to block flow through all but one of the respective ports 42, 48.

The ports 42, 48 are vertically distributed after the apparatus 30 is installed in the wellbore 14, in that some of the ports 42 are vertically higher than others of the ports 42, and some of the ports 48 are vertically higher than others of the ports 48. This vertical distribution is accomplished in the illustrated examples by spacing the ports 42, 48 in circular patterns through the respective bulkheads 36, 38. However, it should be clearly understood that other ways of vertically distributing the ports 42, 48 may be used, if desired.

In the examples described above, the bulkheads 36, 38 are positioned on opposite ends of the chamber 12, and separate devices 40, 46 are used to block flow through the respective ports 42, 48. In other examples, however, these relative positions of the bulkheads 36, 38 and the chamber 12, and the use of separate devices 40, 46, are not necessary.

Figure 12:
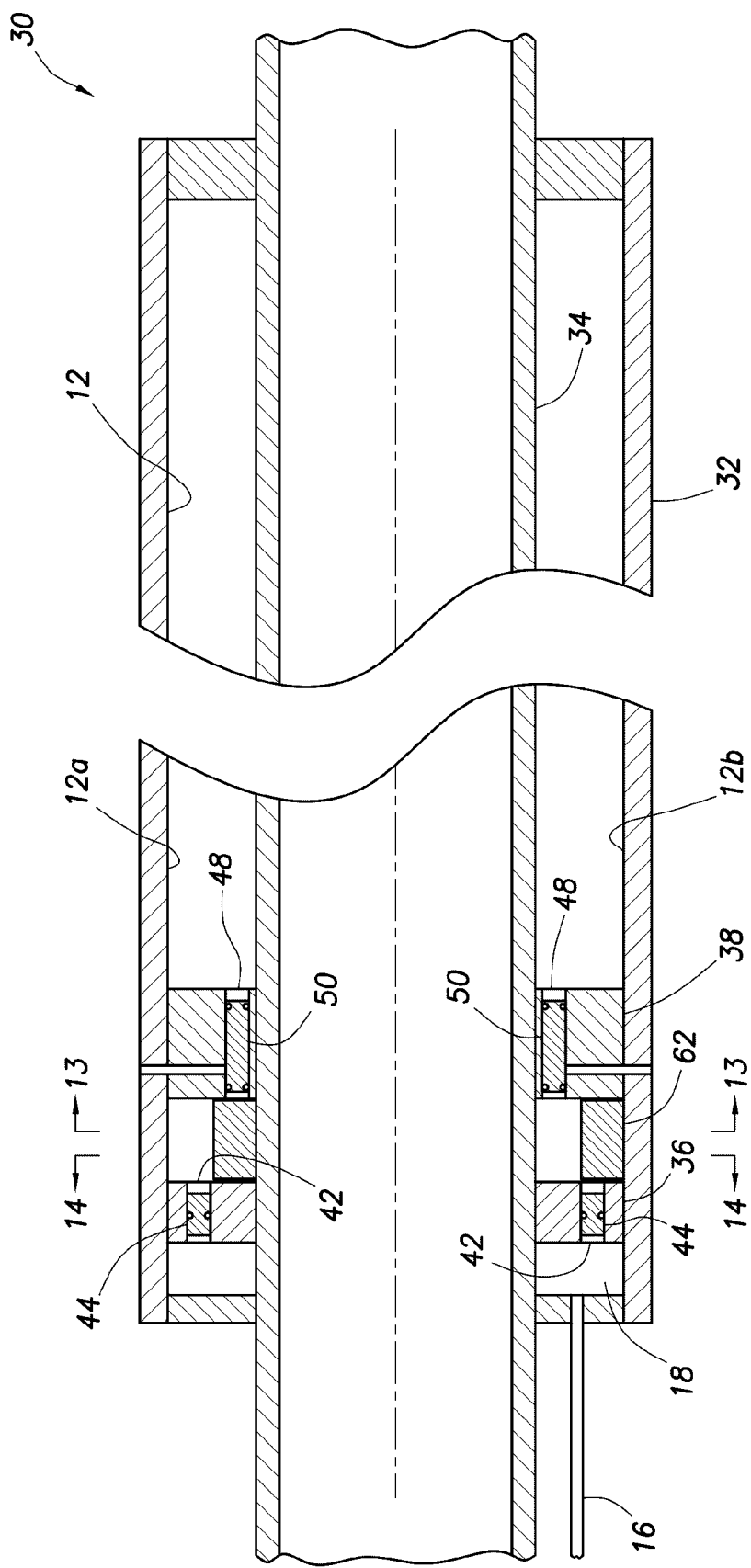
FIG. 12 is a representative cross-sectional view of a further configuration of the apparatus.
Figure 14:
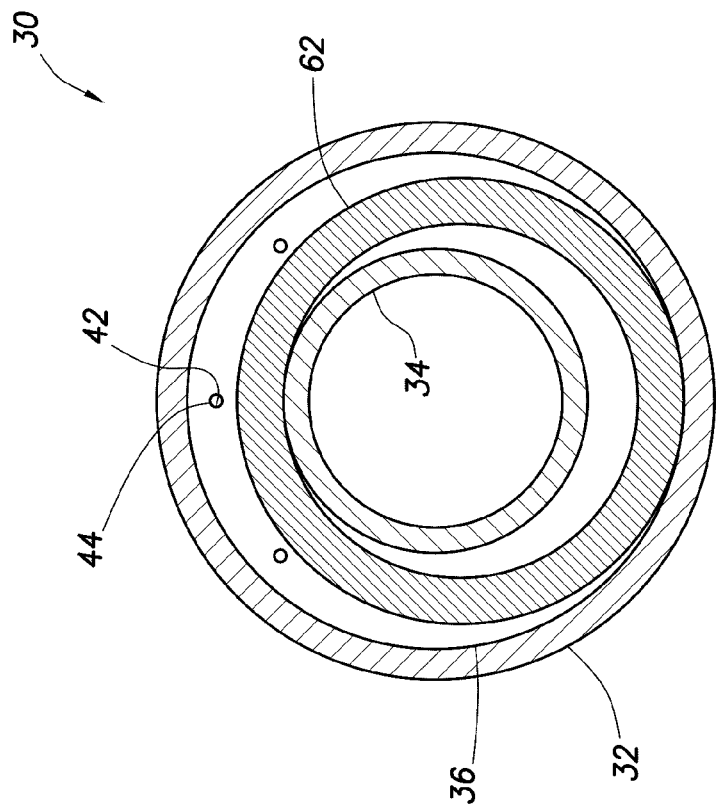
FIGS. 13 & 14 are cross-sectional views of the apparatus, taken along respective lines 13-13 and 14-14 of FIG. 12.
Figure 13:
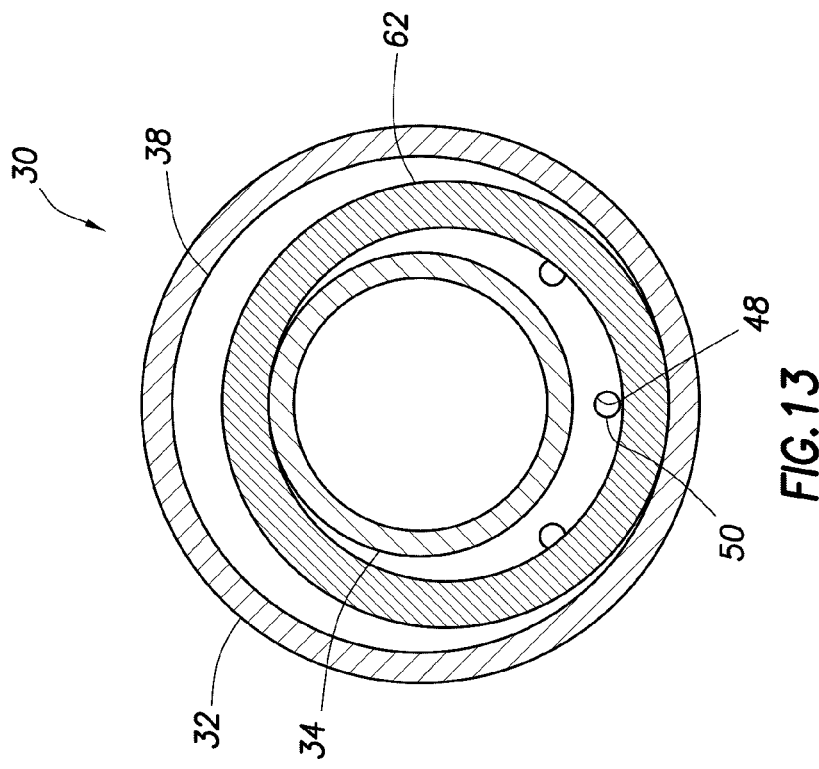

In FIGS. 12-14, a configuration of the apparatus 30 is representatively illustrated, in which the bulkheads 36, 38 are positioned on one side of the chamber 12, and a single device 62 is used to selectively block flow through the uppermost ports 48 and the lowermost ports 42. It will, thus, be readily appreciated that a variety of different configurations of the apparatus 30 may be used, in keeping with the scope of this disclosure.

In any of the configurations of the apparatus 30 described above, the apparatus can be reversed if it will be positioned in a wellbore which is deviated more than 90 degrees from vertical.

It may now be fully appreciated that the above disclosure and accompanying drawings provide several advancements to the art of pressure measurement in wells. In the examples of the apparatus 30 described above, the chamber 12 can be used to measure pressure in highly deviated wells, even though the post-installation rotational orientation of the chamber is not known before installation.

In particular, the above disclosure provides to the art a pressure measurement system 10 for use with a subterranean well. The system 10 can include a chamber 12 positioned in the well, and the chamber 12 having an upper portion 12a and a lower portion 12b as positioned in the well. A device 40 or 62, in response to gravity acting on the device, selects the upper portion 12a of the chamber 12 for communication with a line 16 extending to a remote location.

The device 40 or 62 can selectively block less than all of multiple vertically distributed communication ports 42.

The device 40 or 62 may selectively prevent opening of less than all of the multiple vertically distributed communication ports 42.

The device 40 or 62 may selectively prevent discharge of plugs 44 from less than all of multiple vertically distributed communication ports 42.

Communication between the line 16 and the upper portion 12a of the chamber 12 can be established in response to application of increased pressure to the line 16. Less than all of multiple vertically distributed communication ports 42 may be opened in response to application of the increased pressure to the line 16.

The lower portion 12b of the chamber 12 can be selected in the well. Communication between a wellbore 14 and the lower portion 12b of the chamber 12 can be established in the well. Communication between the wellbore 14 and the lower portion 12b of the chamber 12 can be established in response to application of increased pressure to the line 16.

The device 40 or 62 may displace relative to multiple vertically distributed communication ports 42 in response to gravity acting on the device 40 or 62.

Also described by this disclosure is a method of measuring pressure in a well. The method can include introducing a chamber 12 into the well, then selecting a vertically upper portion 12a of the chamber 12, and establishing communication between the selected upper portion 12a of the chamber 12 and a line 16 extending to a remote location.

Selecting the vertically upper portion 12a of the chamber 12 can be performed by a device 40 or 62 which displaces relative to the chamber 12 in response to gravity acting on the device 40 or 62.

Establishing communication can include applying increased pressure to the line 16. Less than all of multiple vertically distributed communication ports 42 may be opened in response to applying increased pressure to the line 16.

The method can also include selecting a vertically lower portion 12b of the chamber 12 after introducing the chamber 12 into the well. In that case, the method can also include establishing communication between a wellbore 14 and the lower portion 12b of the chamber 12 after selecting the lower portion 12b of the chamber 12. Establishing communication between the wellbore 14 and the lower portion 12b of the chamber 12 can be performed by applying increased pressure to the line 16.

It is to be understood that the various examples described above may be utilized in various orientations, such as inclined, inverted, horizontal, vertical, etc., and in various configurations, without departing from the principles of the present disclosure. The embodiments illustrated in the drawings are depicted and described merely as examples of useful applications of the principles of the disclosure, which are not limited to any specific details of these embodiments.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A pressure measurement system for use with a subterranean well, the system comprising:
   a chamber positioned in the well, and the chamber having an upper portion and a lower portion as positioned in the well; and
   a device which, in response to gravity acting on the device, selects the upper portion of the chamber for communication with a line extending to a remote location, wherein the device selectively blocks less than all of multiple vertically distributed communication ports, and wherein the device displaces relative to the communication ports in response to gravity acting on the device.

2. A pressure measurement system for use with a subterranean well, the system comprising:
   a chamber positioned in the well, and the chamber having an upper portion and a lower portion as positioned in the well; and
   a device which, in response to gravity acting on the device, selects the upper portion of the chamber for communication with a line extending to a remote location, wherein the device selectively prevents opening of less than all of multiple vertically distributed communication ports, and wherein the device displaces relative to the communication ports in response to gravity acting on the device.

3. A pressure measurement system for use with a subterranean well, the system comprising:
   a chamber positioned in the well, and the chamber having an upper portion and a lower portion as positioned in the well; and a device which, in response to gravity acting on the device, selects the upper portion of the chamber for communication with a line extending to a remote location, wherein the device selectively prevents discharge of plugs from less than all of multiple vertically distributed communication ports.

4. A pressure measurement system for use with a subterranean well, the system comprising:

a chamber positioned in the well, and the chamber having an upper portion and a lower portion as positioned in the well; and a device which, in response to gravity acting on the device, selects the upper portion of the chamber for communication with a line extending to a remote location, wherein communication between the line and the upper portion of the chamber is established in response to application of increased pressure to the line, and wherein less than all of multiple vertically distributed communication ports is opened in response to application of the increased pressure to the line.

5. A pressure measurement system for use with a subterranean well, the system comprising:

a chamber positioned in the well, and the chamber having an upper portion and a lower portion as positioned in the well; and a device which, in response to gravity acting on the device, selects the upper portion of the chamber for communication with a line extending to a remote location, wherein the lower portion of the chamber is selected in the well in response to application of increased pressure to the line, wherein communication between a wellbore and the lower portion of the chamber is established in the well.

6. A pressure measurement system for use with a subterranean well, the system comprising:

a chamber positioned in the well, and the chamber having an upper portion and a lower portion as positioned in the well; and a device which, in response to gravity acting on the device, selects the upper portion of the chamber for communication with a line extending to a remote location, wherein the device displaces relative to multiple vertically distributed communication ports in response to gravity acting on the device.

7. A method of measuring pressure in a well, the method comprising:

introducing a chamber into the well;

then selecting a vertically upper portion of the chamber; and establishing communication between the selected upper portion of the chamber and a line extending to a remote location, wherein selecting the vertically upper portion of the chamber is performed by a device which displaces relative to the chamber in response to gravity acting on the device.

8. The method of claim 7, wherein the device selectively blocks less than all of multiple vertically distributed communication ports.

9. The method of claim 7, wherein the device selectively prevents opening of less than all of multiple vertically distributed communication ports.

10. The method of claim 7, wherein the device selectively prevents discharge of plugs from less than all of multiple vertically distributed communication ports.

11. A method of measuring pressure in a well, the method comprising:

introducing a chamber into the well;

then selecting a vertically upper portion of the chamber;

establishing communication between the selected upper portion of the chamber and a line extending to a remote location, wherein establishing communication further comprises applying the increased pressure to the line; and opening less than all of multiple vertically distributed communication ports in response to applying increased pressure to the line.

12. A method of measuring pressure in a well, the method comprising:

introducing a chamber into the well;

then selecting a vertically upper portion of the chamber;

establishing communication between the selected upper portion of the chamber and a line extending to a remote location;

selecting a vertically lower portion of the chamber after introducing the chamber into the well; and establishing communication between a wellbore and the lower portion of the chamber after selecting the lower portion of the chamber.

13. The method of claim 12, wherein establishing communication between the wellbore and the lower portion of the chamber is performed by applying increased pressure to the line.

* * * * *

UNITED STATES PATENT AND TRADEMARK OFFICE
CERTIFICATE OF CORRECTION

| | | |
|---|---|---|
| PATENT NO. | : 8,596,353 B2 | Page 1 of 1 |
| APPLICATION NO. | : 12/964587 | |
| DATED | : December 3, 2013 | |
| INVENTOR(S) | : Joel D. Shaw | |

It is certified that error appears in the above-identified patent and that said Letters Patent is hereby corrected as shown below:

In the Claims

Claim 11, Column 8 line 25, cancel "the" between applying and increased; line 28, insert -- the -- between applying and increased.

Signed and Sealed this
Fourth Day of March, 2014

Michelle K. Lee
*Deputy Director of the United States Patent and Trademark Office*